United States Patent
Wang et al.

(10) Patent No.: US 10,204,362 B2
(45) Date of Patent: Feb. 12, 2019

(54) MARKETPLACE LISTING ANALYSIS SYSTEMS AND METHODS

(71) Applicant: eBay Inc., San Jose, CA (US)

(72) Inventors: Johnson Wang, Shanghai (CN); Shen Huang, Shanghai (CN); Dan Shen, Shanghai (CN)

(73) Assignee: eBay Inc., San Jose, CA (US)

( * ) Notice: Subject to any disclaimer, the term of this patent is extended or adjusted under 35 U.S.C. 154(b) by 830 days.

(21) Appl. No.: 13/714,932

(22) Filed: Dec. 14, 2012

(65) Prior Publication Data
US 2013/0204730 A1 Aug. 8, 2013

Related U.S. Application Data (60) Provisional application No. 61/596,484, filed on Feb. 8, 2012.

(51) Int. Cl.
*G06Q 30/00* (2012.01)
*G06Q 30/06* (2012.01)

(52) U.S. Cl.
CPC ......... *G06Q 30/0601* (2013.01); *G06Q 30/00* (2013.01); *G06Q 30/0641* (2013.01)

(58) Field of Classification Search
CPC . G06Q 30/00; G06Q 30/0601; G06Q 30/0627
USPC ............................................... 705/26.1, 27.1
See application file for complete search history.

(56) References Cited

U.S. PATENT DOCUMENTS

| | | | | |
|---|---|---|---|---|
| 7,111,238 B1 * | 9/2006 | Kuppusamy | .......... | G06F 17/212 715/269 |
| 2006/0149623 A1 * | 7/2006 | Badros | .................... | G06Q 30/02 705/14.66 |
| 2008/0177588 A1 * | 7/2008 | Abbott | .................... | G06Q 30/02 709/224 |
| 2011/0231189 A1 * | 9/2011 | Anastasiadis | ..... | G06F 17/30663 704/243 |
| 2011/0313865 A1 * | 12/2011 | Sinyagin | ............ | G06Q 30/0273 705/14.69 |

FOREIGN PATENT DOCUMENTS

WO WO-0057291 A1 * 9/2000 ........... G06F 17/273

OTHER PUBLICATIONS

Kukich, Karen, Techniques for Automatically Correcting Words in Text, Dec. 1992, ACM Computing Surveys, vol. 24, No. 4 (Year: 1992).*

* cited by examiner

*Primary Examiner* — Brittney N Miller
(74) *Attorney, Agent, or Firm* — Shook, Hardy & Bacon L.L.P.

(57) ABSTRACT

One example embodiment relates to a method that comprises receiving marketplace listing information from a user, the marketplace listing information including a listing title, and accessing a plurality of character patterns for attracting attention to marketplace listings. The method includes analyzing, using one or more processors, the listing title to identify at least one of the plurality of character patterns in the listing title. A request for a new listing title is generated based on identifying at least one of the plurality of character patterns in the listing title.

7 Claims, 6 Drawing Sheets

MARKETPLACE LISTING ANALYSIS SYSTEMS AND METHODS

CLAIM OF PRIORITY

This patent application claims the benefit of priority, under 35 U.S.C. Section 119(e), to Wang U.S. Provisional Patent Application Ser. No. 61/596,484, entitled "Marketplace Listing Analysis Systems and Methods", filed on Feb. 8, 2012 ,which is hereby incorporated by reference herein in its entirety.

TECHNICAL FIELD

The present disclosure generally relates to data processing techniques and, more specifically, to systems and methods to analyze electronic commerce listings.

BACKGROUND

Advancements in computer and networking technology enable users and entities to conduct various types of transactions online via computer-based applications and systems. These online activities may include offering items for purchase through listings in, for example, a network-based marketplace.

SUMMARY

In an example embodiment, a system comprises at least one module, executing on one or more computer processors, to receive marketplace listing information from a user, the marketplace listing information including a listing title; access a plurality of character patterns for attracting attention to marketplace listings; analyze, using one or more processors, the listing title to identify at least one of the plurality of character patterns in the listing title; and generate a request for a new listing title based on identifying at least one of the plurality of character patterns.

In an example embodiment, a machine-readable medium includes instructions, which when performed by a machine, cause the machine to perform the operations of: receiving marketplace listing information from a user, the marketplace listing information including a listing title; accessing a plurality of character patterns for attracting attention to marketplace listings; analyzing, using one or more processors, the listing title to identify at least one of the plurality of character patterns in the listing title; and generating a request for a new listing title based on identifying at least one of the plurality of character patterns.

In an example embodiment, a system comprises at least one module executing on one or more computer processors, to identify a set of known character patterns for attracting attention to a marketplace listing; identify new character patterns used in a recent marketplace listing; update the set of known character patterns by adding the new character patterns; store the character patterns; and apply the updated set of character patterns when analyzing subsequent marketplace listing submissions.

In an example embodiment, a machine readable medium includes instructions, which when performed by a machine, cause the machine to perform the operations of identifying a set of known character patterns for attracting attention to a marketplace listing; identifying new character patterns used in a recent marketplace listing; updating the set of known character patterns by adding the new character patterns; storing the character patterns; and applying the updated set of character patterns when analyzing subsequent marketplace listing submissions.

In an example embodiment, a system comprises at least one module executing on one or more computer processors, to generate a seed set of known marketplace listing character patterns for attracting attention to a marketplace listing; identify common features of the seed set; and applying one or more machine learning algorithms to identify additional character patterns not contained in the seed set.

In an example embodiment, a machine readable medium, including instructions, which when performed by a machine, cause the machine to perform the operations of generating a seed set of known marketplace listing character patterns for attracting attention to a marketplace listing; identifying common features of the seed set; and applying one or more machine learning algorithms to identify additional character patterns not contained in the seed set.

In an example embodiment, a system comprises at least one module, executing on one or more computer processors, to identify known examples of character patterns for attracting attention to a marketplace listing; analyze new marketplace listings for additional examples of character patterns for attracting attention to a market place listing; aggregate the known and new examples of character patterns into a database; generate rules based on the aggregated examples of character patterns; and apply the rules to new marketplace listings.

In an example embodiment, a machine readable medium includes instructions, which when performed by a machine, cause the machine to perform the operations of identifying known examples of character patterns for attracting attention to a marketplace listing; analyzing new marketplace listings for additional examples of character patterns for attracting attention to a market place listing; aggregating the known and new examples of character patterns into a database; generating rules based on the aggregated examples of character patterns; and applying the rules to new marketplace listings.

BRIEF DESCRIPTION OF THE DRAWINGS

Some embodiments are illustrated by way of example and not limitation in the figures of the accompanying drawings.

DETAILED DESCRIPTION

Example systems and methods to analyze marketplace listings are described. In the following description, for purposes of explanation, numerous specific details are set forth in order to provide a thorough understanding of example embodiments. It will be evident, however, to one skilled in the art that the present invention may be practiced without these specific details.

Although particular examples discussed herein refer to analyzing a title contained in a marketplace listing, similar systems and methods are applicable to any type of data associated with a marketplace listing, such as a category, description, summary, and the like.

Figure 1:
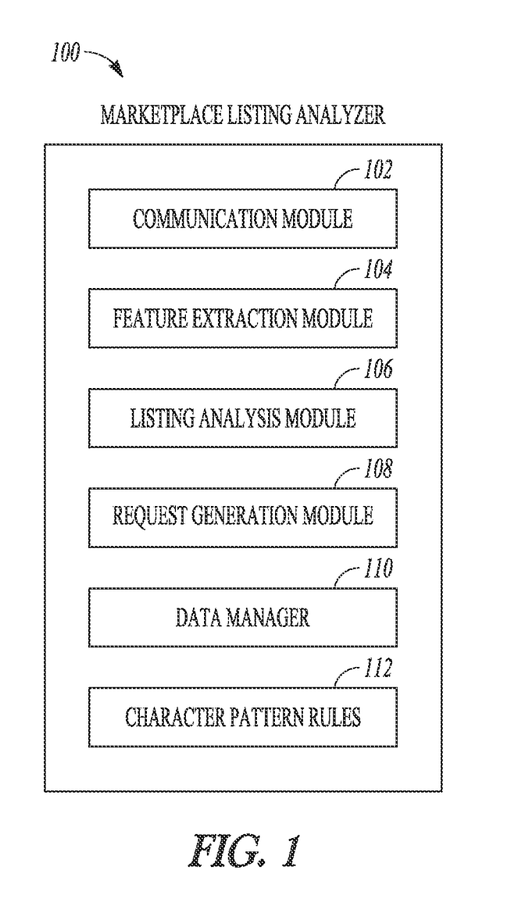
FIG. 1 is a block diagram depicting an example marketplace listing analyzer.

FIG. 1 is a block diagram depicting an example marketplace listing analyzer 100. As discussed herein, marketplace listing analyzer 100 is capable of analyzing marketplace listings to identify attempts to attract attention to certain portions of a marketplace listing, such as the title. For example, a user creating a listing may include the following character pattern in the title: "U*N*I*Q*U*E". In this example, the user may intend to attract attention to the listing with the particular character pattern. By using these character patterns, the user is attempting to make their listing stand out visually from other listings that utilize conventional listing techniques (e.g., using "Unique" instead of "U*N*I*Q*U*E").

However, in practice, this type of character pattern may not attract
potential buyers because the character pattern is not typically searched by a user or entity. For example, a search for "unique" in a marketplace listing will not identify a listing with the character pattern "U*N*I*Q*U*E". Thus, an attempt to attract attention to a marketplace listing using "U*N*I*Q*U*E" may produce the opposite result (i.e., the marketplace listing receives less attention due to the unconventional character pattern). Other types of character patterns used to attract attention include "r_a_r_e", "N_E_W", "U n I Q u E", "New", and the like. Regular or irregular patterns are possible.

The marketplace listing analyzer 100 includes a communication module 102 for communicating with various systems, devices, components, modules, and the like. A feature extraction module 104 identifies and extracts various features from a marketplace listing. For example, the feature extraction module may extract features, such as character sequences or character patterns, from a marketplace listing title. The extracted features are provided to a listing analysis module 106 that analyzes marketplace listing data to identify character sequences intended to attract attention. In some embodiments, the listing analysis module 106 specifically searches a listing title for character patterns that are intended to attract attention. The listing analysis module 106 may also store various character patterns for use in later analysis. In some embodiments, the listing analysis module accesses one or more character pattern rules that define multiple character patterns used to attract attention to marketplace listings. As new patterns for attracting attention are identified, the listing analysis module 106 updates stored character patterns and/or character pattern rules for use in analyzing subsequent marketplace listings.

Marketplace listing analyzer 100 further includes a request generation module 108 to generate requests for revised marketplace listings. For example, if the listing analysis module identifies a character pattern used to attract attention to a marketplace listing, the user or entity associated with the marketplace listing may receive a request to revise the marketplace listing in a manner that removes the character pattern used to attract attention to the marketplace listing. A data manager 110 stores and retrieves data used by marketplace listing analyzer 100 and the various components of marketplace listing analyzer 100. As mentioned above, any number of character pattern rules 112 (and specific character patterns) may be stored in marketplace listing analyzer 100 for use in analyzing any number of marketplace listings. In some embodiments, the character pattern rules and specific character patterns are stored within marketplace listing analyzer 100. In other embodiments, the character pattern rules and specific character patterns are stored in a database or other storage mechanism coupled to the marketplace listing analyzer 100.

Figure 2:
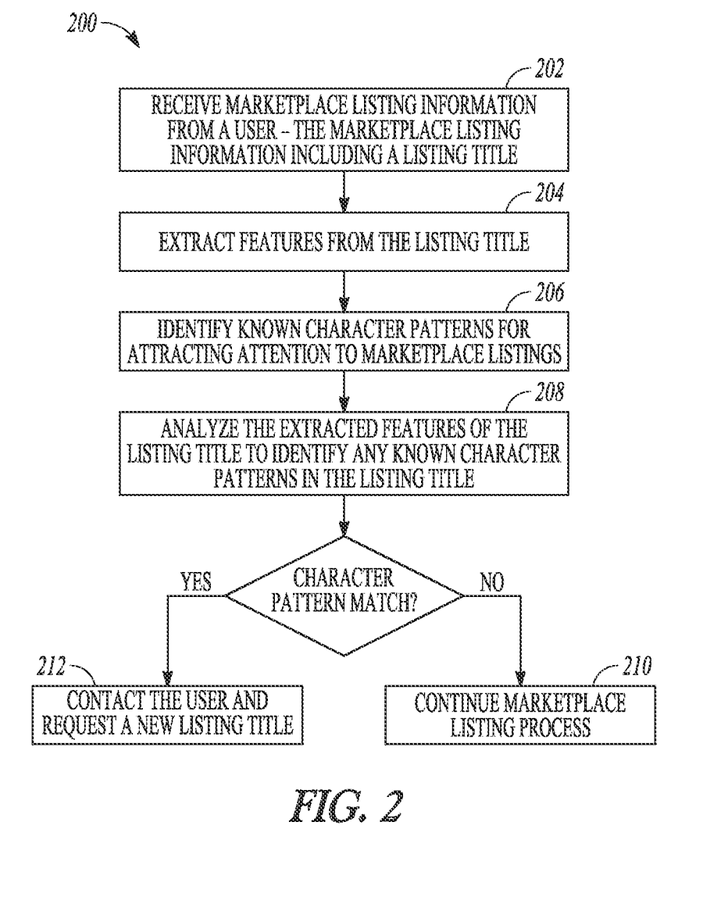
FIG. 2 is a flow diagram of a method, in accordance with an embodiment, of identifying character patterns in a marketplace listing that are intended to attract attention to the marketplace listing.

FIG. 2 is a flow diagram of a method 200, in accordance with an embodiment, of identifying character patterns in a marketplace listing that are intended to attract attention to the marketplace listing. Initially, at 202, marketplace listing information is received from a user, entity or system. In particular embodiments, the marketplace listing information is received by a system that implements at least a portion of a marketplace, such as an online or electronic commerce marketplace. The marketplace listing information may include various data, such as a listing title, a description of the item associated with the listing, a photo of the item, a price, a location, condition of the item (e.g., new or used), and so forth. Additionally, the marketplace listing information may include information about the user or entity generating the marketplace listing. In some embodiments, the marketplace listing is generated by an individual user or an entity. In other embodiments, the marketplace listing is generated by a system (e.g., a computing system) that automatically generates and/or communicates listing information associated with one or more marketplace listings.

The method 200 continues at 204 by extracting features from the listing title, which includes, for example, identifying characters, character patterns or character groups within the listing title. In some embodiments, this is performed by measuring a similarity between words/characters in the listing title and known patterns. The similarity can be defined using a variety of string similarity functions, such as a string metric, Bonacci distance, Euclidean distance, Hamming distance, Jaro-Winkler distance, overlap coefficient, Wagner-Fischer algorithm, Lee distance, Levenshtein distance, and the like. The method continues at 206 by identifying known character patterns for attracting attention to marketplace listings. For example, one or more character pattern rules or other data may be accessed that define known character patterns for attracting attention.

The extracted features from the listing title are then analyzed at 208 based on the known character patterns for attracting attention. This analysis applies various character pattern rules and/or other data to the listing title to identify known character patterns that are used in the listing title. If the title does not contain any of the known character patterns, the marketplace listing process continues at 210 (e.g., providing additional marketplace listing details and publishing the listing within the marketplace). If the title contains at least one known character pattern for attracting attention, the user (or entity/system generating the marketplace listing) is contacted at 212 with a request to provide a new listing title that does not contain the identified character pattern. In some embodiments, the request identifies the specific portion of the listing title that caused the rejection of the title. Additionally, the request may explain the disadvantages to the user of including the character pattern in the listing title (e.g., the listing may not appear in search results due to the unconventional spelling or additional characters that are not identified by the search process).

Figure 3:
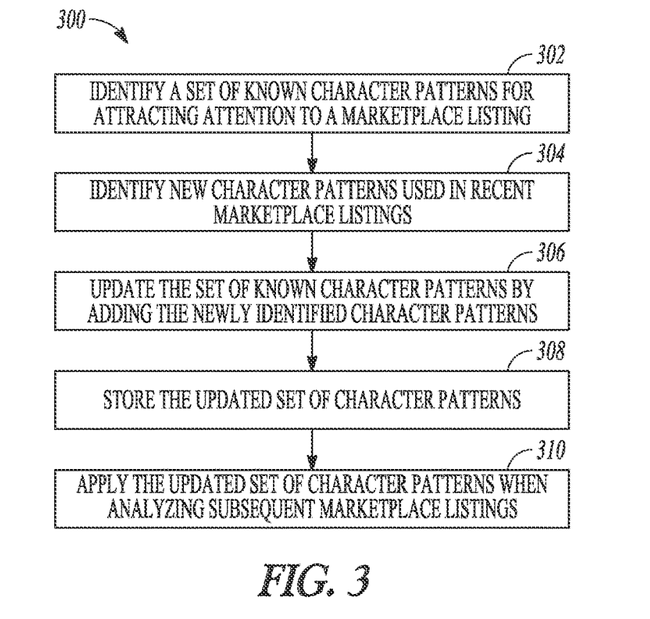
FIG. 3 is a flow diagram of a method, in accordance with an embodiment, of updating character pattern definitions intended to attract attention to the marketplace listing.

FIG. 3 is a flow diagram of a method 300, in accordance with an embodiment, of updating character pattern definitions intended to attract attention to the marketplace listing. Initially, the method identifies at 302 a set of known character patterns for attracting attention to a marketplace listing. The method continues at 304 by identifying new character patterns used in recent marketplace listings. For example, as the systems and methods described herein restrict certain techniques for attracting attention to marketplace listings, some users may try different techniques to circumvent the known character patterns. The method 300 identifies these new character patterns and at 306 updates the set of known character patterns by adding the new character patterns. The updated set of character patterns is stored at 308 and applied at 310 when analyzing subsequent marketplace listing submissions. The method 300 may further comprise generating a request for a revised listing based on identifying at least one of the known or new character patterns in the recent marketplace listing. The request for a revised listing may include a reason for requesting the revised listing.

Figure 4:
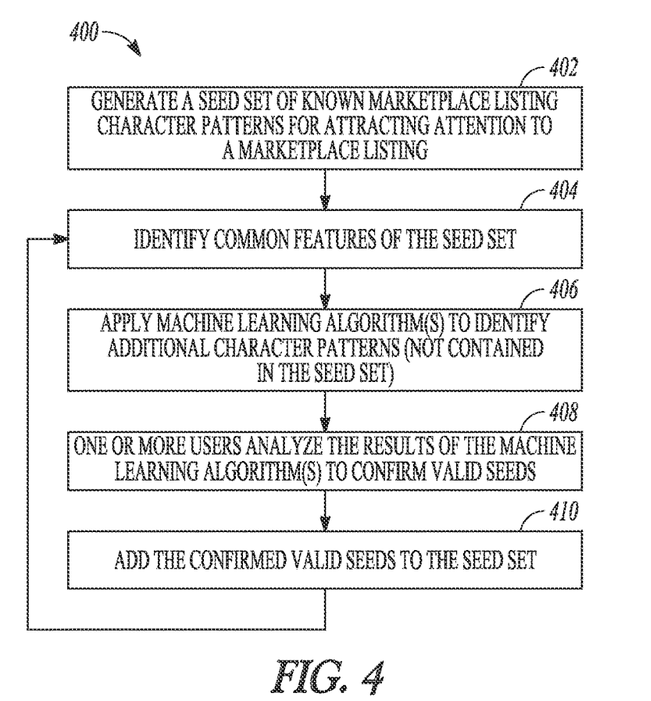
FIG. 4 is a flow diagram of a method, in accordance with an embodiment, of automatically identifying and updating character pattern definitions intended to attract attention to marketplace listings.

FIG. 4 is a flow diagram of a method 400, in accordance with an embodiment, of automatically identifying and updating character pattern definitions intended to attract attention to marketplace listings. Initially, method 400 generates at 402 a seed set of known marketplace listing character patterns for attracting attention to a marketplace listing. The seed set includes, for example, the character pattern rules discussed herein. The method continues at 404 by identifying common features of the seed set, such as usage of "***", "!!!" or "###". The method then applies at 406 one or more machine learning algorithms to identify additional character patterns (not contained in the seed set) that indicate an attempt to attract attention to a marketplace listing. Example machine learning algorithms include SVM (Support Vector Machine) and Naïve Bayes.

The results of the machine learning algorithm(s) are analyzed at 408 by one or more users to confirm whether the identified patterns are valid seeds. For example, the users may determine whether the identified patterns are actually being used to attract attention to marketplace listings. The patterns that are confirmed by one or more users as valid seeds are added at 410 to the seed set. The procedure of FIG. 4 continues by repeatedly applying one or more machine learning algorithms to identify additional character patterns not already contained in the seed set.

As discussed above, the similarity between character sets (e.g., between seed patterns (known for attracting attention) and a proposed marketplace listing title) is determined using string similarity functions. For example, sim(w1, p1) represents the similarity between title words w1 with pattern p1 in the seed set (or dictionary). An example rule accepts word w1 as a valid character pattern (i.e., indicative of a listing that is trying to attract attention) if the similarity score between w1 and p1 is greater than 0.8. In another example, two different elements are used: If sim(w1, p1)>0.8 and sim(w1, p2)>0.9 then w1 is accepted as a valid character pattern. In other embodiments, multiple similarity functions are used to determine whether to accept a particular word w1 as a valid character pattern.

Figure 5:
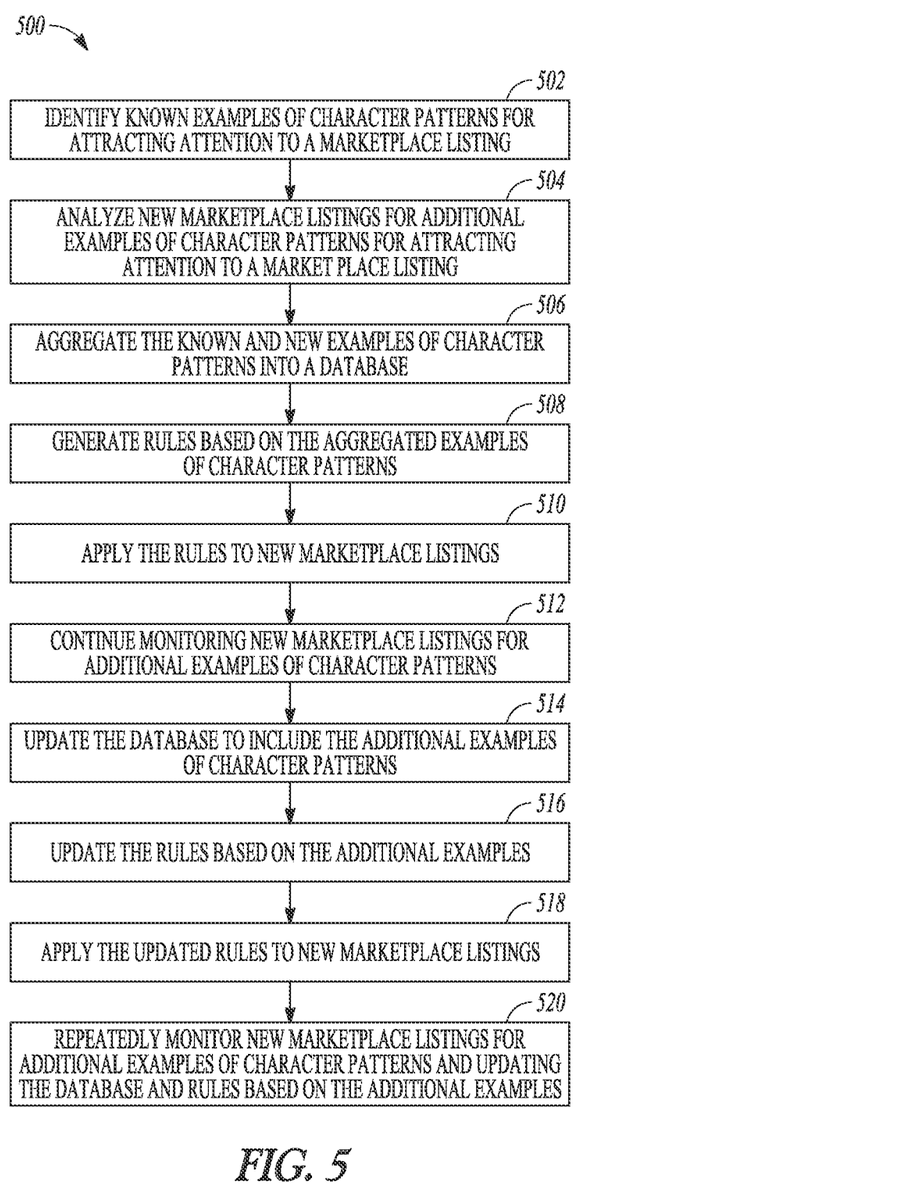
FIG. 5 is a flow diagram of a method, in accordance with an embodiment, of automatically identifying known examples of character pattern definitions intended to attract attention to marketplace listings, and analyzing new listings for additional samples of character pattern definitions.

FIG. 5 is a flow diagram of a method 500, in accordance with an embodiment, of automatically identifying known examples of character pattern definitions intended to attract attention to marketplace listings, and analyzing new listings for additional samples of character pattern definitions. Initially, method 500 identifies at 502 known examples of character patterns for attracting attention to a marketplace listing. The method continues at 504 by analyzing new marketplace listings for additional examples of character patterns for attracting attention to a market place listing. The method 500 continues at 506 by aggregating the known and new examples of character patterns into a database. The new or known examples in the database may, for example, be stored or retrieved by the Data Manager described above with reference to FIG. 1. In an example, the database may be the database 526 described further below with reference to FIG. 5.

At 508, the method 500 generates rules based on the aggregated examples of character patterns. The rules may include similarity rules or functions. The rules may include character pattern rules and/or other data that define multiple character patterns used to attract attention to marketplace listings. The rules may include string similarity rules of the type described herein. The method 500 applies at 510 the rules to new marketplace listings and at 512 continues monitoring new marketplace listings for additional examples of character patterns for attracting attention to a market place listing.

The method 500 continues at 514 by updating the database to include the additional examples of character patterns and at 516 updates the rules based on the additional examples. The method 500 applies at 518 the updated rules to new marketplace listings. The procedure of FIG. 5 may continue at 520 by repeatedly monitoring new marketplace listings for additional examples of character patterns and updating the database and rules based on the additional examples.

Figure 6:
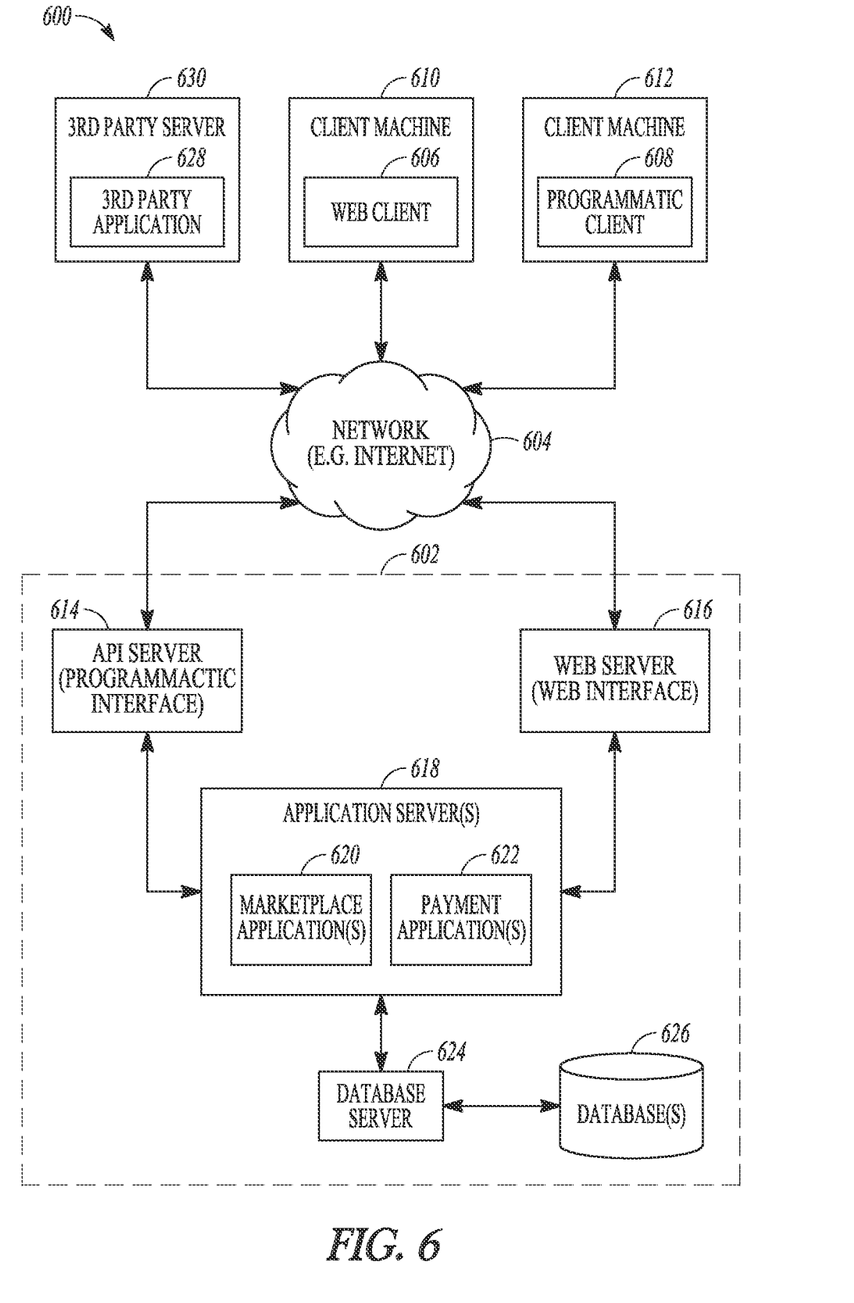
FIG. 6 is a network diagram depicting a client-server system within which an example embodiment may be deployed.

FIG. 6 is a network diagram depicting a client-server system 600, within which one example embodiment may be deployed. A networked system 602, in the example form of a network-based marketplace or other system, provides server-side functionality, via a network 604 (e.g., the Internet or Wide Area Network (WAN)) to one or more clients. FIG. 6 illustrates, for example, a web client 606 (e.g., a browser, such as the Internet Explorer® browser developed by Microsoft Corporation of Redmond, Wash.), and a programmatic client 608 executing on respective client machines 610 and 612.

An Application Programming Interface (API) server 614 and a web server 616 are coupled to, and provide programmatic and web interfaces respectively to, one or more application servers 618. Application servers 618 host one or more marketplace applications 620 and payment applications 622. Application servers 618 are, in turn, shown to be coupled to one or more database servers 624 that facilitate access to one or more databases 626.

Marketplace applications 620 may provide a number of marketplace functions and services to users that access networked system 602. Payment applications 622 may likewise provide a number of payment services and functions to users. Payment applications 622 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 620. While the marketplace and payment applications 620 and 622 are shown in FIG. 6 to both form part of networked system 602, it will be appreciated that, in alternative embodiments, payment applications 622 may form part of a payment service that is separate and distinct from networked system 602.

Further, while the system 600 shown in FIG. 6 employs client-server architecture, the present subject matter is of course not limited to such an architecture, and could equally well find application in a distributed, or peer-to-peer, architecture system, for example. The various marketplace and payment applications 620 and 622 could also be implemented as standalone software programs, which do not necessarily have networking capabilities.

Web client 606 accesses the various marketplace and payment applications 620 and 622 via the web interface supported by web server 616. Similarly, programmatic client 608 accesses the various services and functions provided by the marketplace and payment applications 620 and 622 via the programmatic interface provided by API server 614. Programmatic client 608 may, for example, be a seller application (e.g., the TurboLister application developed by eBay Inc., of San Jose, Calif.) to enable sellers to author and manage listings on networked system 602 in an off-line manner, and to perform batch-mode communications between programmatic client 608 and networked system 602. Some embodiments of the present invention may be implemented by components of the marketplace application(s) 620.

FIG. 6 also illustrates a third party application 628, executing on a third party server machine 630, as having programmatic access to networked system 602 via the programmatic interface provided by API server 614. For example, third party application 628 may, utilizing information retrieved from networked system 602, support one or more features or functions on a website hosted by the third party. The third party website may, for example, provide one or more promotional, marketplace or payment functions that are supported by the relevant applications of the networked system 602.

Figure 7:
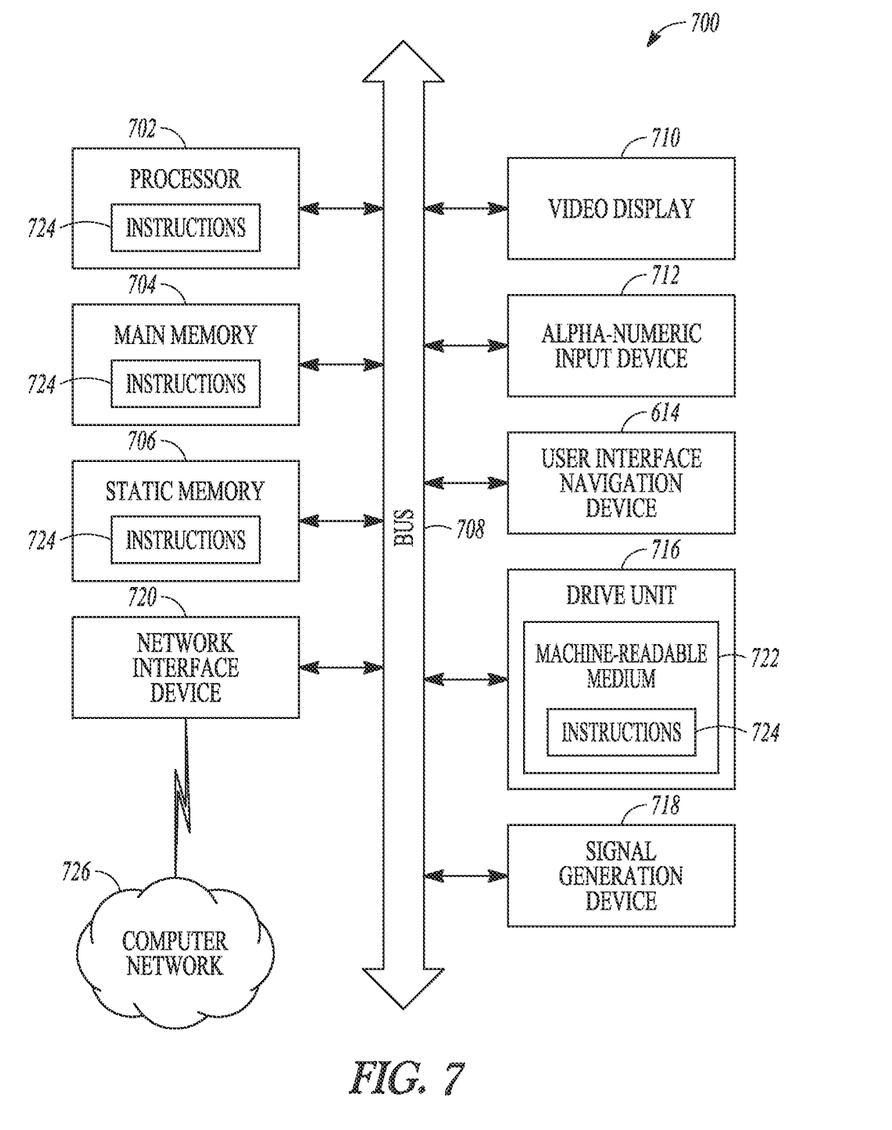
FIG. 7 is a block diagram of a machine in the example form of a computer system within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable storage medium 722 on which is stored one or more sets of instructions (e.g., software) 724 embodying any one or more of the methodologies or functions described herein. The software 724 may also reside, completely or at least partially, within the main memory 704, within the static memory 706, and/or within the processor 702 during execution thereof by the computer system 700, the main memory 704 and the processor 702 also constituting machine-readable media. The software 724 may further be transmitted or received over a network 726 via the network interface device 720.

While the machine-readable storage medium 722 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules, A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Herein are set out hardware (e.g., machine) and software architectures that may be deployed, in various example embodiments.

Thus, marketplace-listing analysis systems and methods have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In the foregoing description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the description, with each claim standing on its own as a separate embodiment.

What is claimed is:
1. A system comprising:
one or more computer processors; and
at least one module, executing on the one or more computer processors, configured to:
identify a seed set of known character patterns containing unconventional character sequences not included in user search queries submitted to a network-based publication system;
apply machine learning to the seed set of known character patterns to identify one or more additional character patterns containing unconventional character sequences not included in user search queries submitted to the network-based publication system;
update the seed set of known character patterns to include at least one of the one or more identified additional character patterns;
generate a set of rules that include string similarity functions generated from the seed set of known character patterns;
obtain marketplace listing information from a user, the marketplace listing information including a listing title;
analyze the listing title to determine whether 1) the listing title contains at least one known character pattern of the seed set of known character patterns in the listing title based on a similarity between the listing title and the at least one known character pattern determined using at least one of the string similarity functions, 2) the listing title contains at least one new character pattern containing unconventional character sequences not included in user search queries submitted to the network-based publication system, or 3) the listing title does not contain at least one known character pattern of the seed set of known character patterns or at least one new character pattern; and
in response to the analysis of the listing title, perform one of:
if the listing title contains at least one known character pattern of the seed set of known character patterns, generate a request for a new listing title;
if the listing title contains at least one new character pattern, update the seed set of known character patterns to include the at least one new character pattern and generate the request for the new listing title; and
if the listing title does not contain at least one known character pattern of the seed set of known character patterns or at least one new character pattern, publish a listing comprising the marketplace listing information within the network-based publication system.

2. The system of claim 1, wherein the at least one module is further configured to extract features from the listing title.

3. The system of claim 1, wherein the request for the new listing title includes a reason for requesting the new listing title.

4. A non-transitory machine readable medium, including instructions, which when executed by a machine, cause the machine to perform operations comprising:
identifying a seed set of known character patterns containing unconventional character sequences not included in user search queries submitted to a network-based publication system;
applying machine learning to the seed set of known character patterns to identify one or more additional character patterns containing unconventional character sequences not included in user search queries submitted to the network-based publication system;
updating the seed set of known character patterns to include at least one of the one or more identified additional character patterns;
generating a set of rules that include string similarity functions generated from the seed set of known character patterns;
obtaining marketplace listing information from a user, the marketplace listing information including a listing title;
analyzing the listing title to determine whether 1) the listing title contains at least one known character pattern of the seed set of known character patterns in the listing title based on a similarity between the listing title and the at least one known character pattern determined using at least one of the string similarity functions, 2) the listing title contains at least one new character pattern containing unconventional character sequences not included in user search queries submitted to the network-based publication system, or 3) the listing title does not contain at least one known character pattern of the seed set of known character patterns or at least one new character pattern; and
in response to the analysis of the listing title, performing one of:
if the listing title contains at least one known character pattern of the seed set of known character patterns, generating a request for a new listing title;
if the listing title contains at least one new character pattern, updating the seed set of known character patterns to include the at least one new character pattern and generating the request for the new listing title; and
if the listing title does not contain at least one known character pattern of the seed set of known character patterns or at least one new character pattern, publishing a listing comprising the marketplace listing information within the network-based publication system.

5. A method comprising:
identifying, by one or more processors, a seed set of known character patterns containing unconventional character sequences not included in user search queries submitted to a network-based publication system;
applying, by the one or more processors, machine learning to the seed set of known character patterns to identify one or more additional character patterns containing unconventional character sequences not included in user search queries submitted to the network-based publication system;
updating, by the one or more processors, the seed set of known character patterns to include at least one of the one or more identified additional character patterns;
generating, by the one or more processors, a set of rules that include string similarity functions generated from the seed set of known character patterns;
obtaining, by the one or more processors, marketplace listing information from a user, the marketplace listing information including a listing title;
analyzing, using the one or more processors, the listing title to determine whether 1) the listing title contains at least one known character pattern of the seed set of known character patterns in the listing title based on a similarity between the listing title and the at least one known character pattern determined using at least one of the string similarity functions, 2) the listing title contains at least one new character pattern containing unconventional character sequences not included in user search queries submitted to the network-based publication system, or 3) the listing title does not contain at least one known character pattern of the seed set of known character patterns or at least one new character pattern; and in response to the analysis of the listing title, performing, by the one or more processors, one of:

if the listing title contains at least one known character pattern of the seed set of known character patterns, generating a request for a new listing title;

if the listing title contains at least one new character pattern, updating the seed set of known character patterns to include the at least one new character pattern and generating the request for the new listing title; and if the listing title does not contain at least one known character pattern of the seed set of known character patterns or at least one new character pattern, publishing a listing comprising the marketplace listing information within the network-based publication system.

6. The method of claim 5, further comprising extracting features from the listing title.

7. The method of claim 5, wherein the request for the new listing title includes a reason for requesting the new listing title.

* * * * *